US011852181B1

(12) United States Patent
Thomasson et al.

(10) Patent No.: US 11,852,181 B1
(45) Date of Patent: Dec. 26, 2023

(54) SEPARATION BOLT BY EUTECTIC DECOHESION

(71) Applicants: Timothy James Thomasson, Woodford, VA (US); Michael James Parsons, King George, VA (US)

(72) Inventors: Timothy James Thomasson, Woodford, VA (US); Michael James Parsons, King George, VA (US)

(73) Assignee: United States of America, as represented by the Secretary of the Navy, Arlington, VA (US)

( * ) Notice: Subject to any disclaimer, the term of this patent is extended or adjusted under 35 U.S.C. 154(b) by 375 days.

(21) Appl. No.: 17/460,781

(22) Filed: Aug. 30, 2021

(51) Int. Cl.
*F16B 35/00* (2006.01)
*F16B 31/00* (2006.01)

(52) U.S. Cl.
CPC .................................. *F16B 31/005* (2013.01)

(58) Field of Classification Search
CPC ..................................................... F16B 31/005
USPC ............................................................ 411/391
See application file for complete search history.

(56) References Cited

U.S. PATENT DOCUMENTS

| 2,268,211 | A |  | 12/1941 | Hathorn | 24/19 |
| 2,541,205 | A |  | 2/1951 | Christophersen | 285/129 |
| 2,679,783 | A |  | 6/1954 | Smith | 85/1 |
| 2,895,756 | A |  | 7/1959 | Gair | 287/62 |
| 2,955,340 | A |  | 10/1960 | Zartler | 24/279 |
| 3,087,369 | A |  | 4/1963 | Butterfield | 85/1 |
| 3,119,298 | A | * | 1/1964 | Brown | F16B 31/005 411/440 |
| 3,237,521 | A | * | 3/1966 | Francis | F42B 3/006 411/440 |
| 3,277,766 | A | * | 10/1966 | Burkdoll | F16B 31/005 89/1.14 |

(Continued)

OTHER PUBLICATIONS

D. Kolman: "A Review of Recent Advances . . . in Liquid Metal Embrittlement" *Corrosion* 75(1), 2019. LANL LA-UR-18-24764. https://www.osti.gov/pages/servlets/purl/1479997.

(Continued)

*Primary Examiner* — Gary W Estremsky
(74) *Attorney, Agent, or Firm* — Gerhard W. Thielman

(57) ABSTRACT

An axially separable fastener for securing a structure is provided to detach upon command of an electric signal. The fastener includes a metal bolt, an external nut, a frangible ampoule containing a liquid metal eutectic and an internal plug. The bolt has a metal shank with proximal and distal ends. The shank includes a first head at the proximal end, and a first helical external thread and an axial bore with a first helical internal thread at the distal end. The fastener secures a structure in compression between the first head and the external nut. The external nut screws onto the first external thread. The ampoule contains a liquid metal eutectic. The ampoule is insertable into the bore. The internal plug includes a second head, an actuator mechanism, and an auger opposite thereto. The internal plug has a second helical external thread between the second head and the auger for screwing into the bore along the first internal thread. Upon receipt of the signal, the internal plug axially drives the auger towards the proximal end into the ampoule to release the eutectic, thereby fracturing the bolt.

15 Claims, 5 Drawing Sheets

(56) References Cited

U.S. PATENT DOCUMENTS

| | | | | |
|---|---|---|---|---|
| 3,352,189 A * | 11/1967 | Brown | ............ | F42B 3/006 411/395 |
| 3,374,702 A * | 3/1968 | Menichelli | ............ | F42B 3/006 411/395 |
| 3,449,996 A * | 6/1969 | Takahashi | ............ | F16B 4/002 411/395 |
| 3,530,759 A * | 9/1970 | Francis | ............ | F16B 31/005 89/1.14 |
| 3,582,017 A * | 6/1971 | Zecca | ............ | B64G 1/645 102/377 |
| 3,744,825 A | 7/1973 | Cooper et al. | ............ | 285/407 |
| 3,964,773 A | 6/1976 | Stade et al. | ............ | 285/367 |
| 4,365,643 A * | 12/1982 | Masclet | ............ | F16K 17/383 137/224 |
| 4,986,708 A * | 1/1991 | Moore | ............ | F42B 3/006 411/391 |
| 5,226,617 A | 7/1993 | Panin | ............ | 244/158 |
| 5,454,606 A | 10/1995 | Voss et al. | ............ | 285/367 |
| 5,997,230 A * | 12/1999 | Dodd | ............ | F42B 3/006 411/908 |
| 6,076,467 A | 6/2000 | Cespedosa et al. | ............ | 102/378 |
| 6,289,818 B1 * | 9/2001 | Mueller | ............ | F42B 15/36 102/377 |
| 10,989,243 B2 | 4/2021 | Thomas et al. | | |
| 2006/0027083 A1 * | 2/2006 | Lee | ............ | F42B 3/006 89/1.14 |
| 2015/0059905 A1 | 3/2015 | Jones et al. | ............ | F16L 19/065 |
| 2016/0102689 A1 | 4/2016 | Madsen et al. | ............ | F16B 2/06 |

OTHER PUBLICATIONS

B. Zoellner et al.: "Activating the Growth of High Surface Area Alumina . . . " *ACS Omega* 3, 16409-15, 2018 https://www.ncbi.nlm.nih.gov/pmc/articles/PMC6643776/pdf/ao8b02442.pdf.

EaglePicher™ Technologies, LLC, Energetic Devices https://www.eaglepicher.com/sites/default/files/EaglePicher_EnergeticDevicesCatalog_0.pdf.

* cited by examiner

SECTION A-A

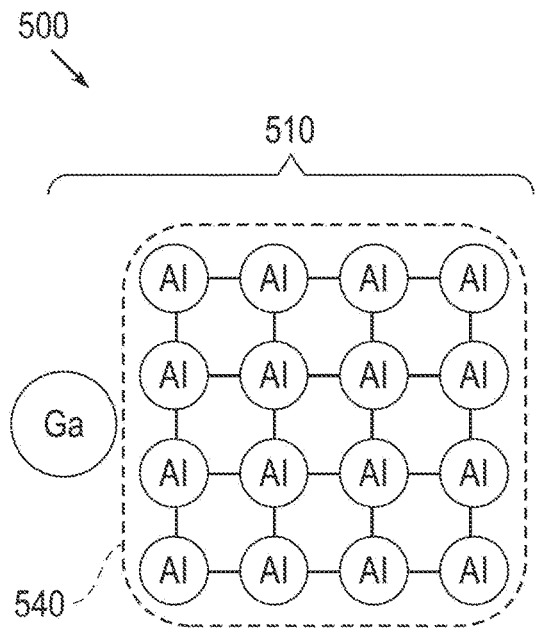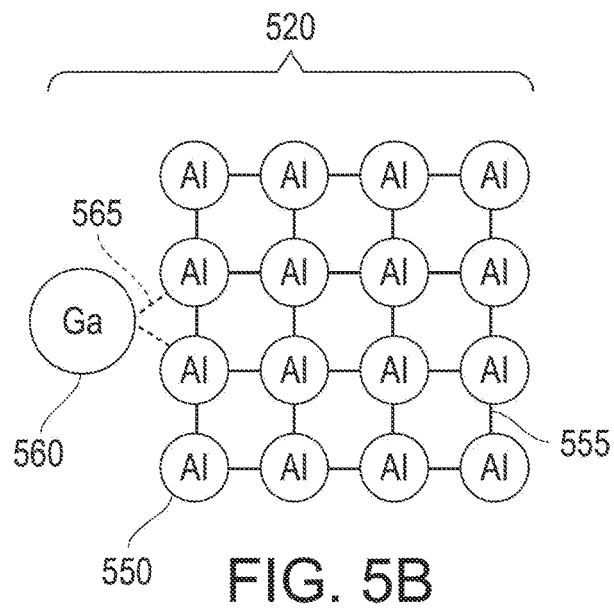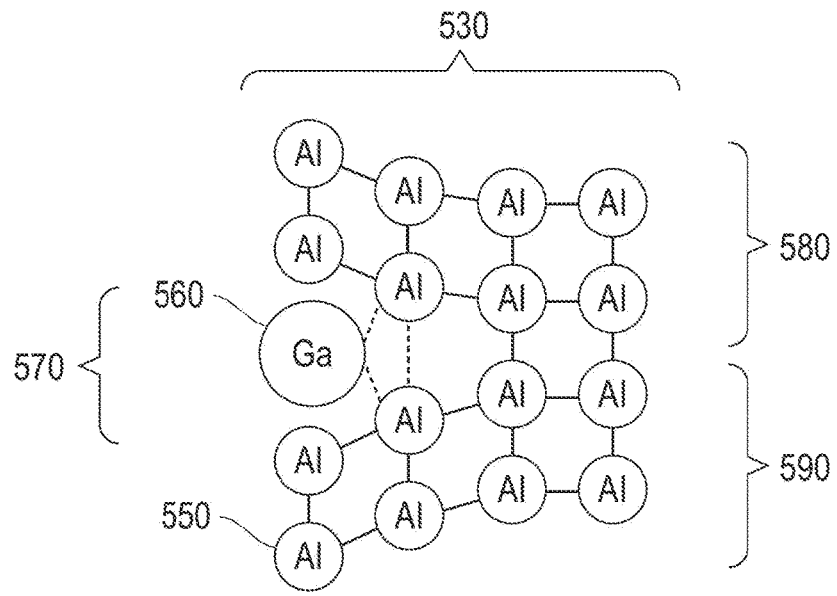
FIG. 5A
FIG. 5B
FIG. 5C

US 11,852,181 B1

SEPARATION BOLT BY EUTECTIC DECOHESION

STATEMENT OF GOVERNMENT INTEREST

The invention described was made in the performance of official duties by one or more employees of the Department of the Navy, and thus, the invention herein may be manufactured, used or licensed by or for the Government of the United States of America for governmental purposes without the payment of any royalties thereon or therefor.

BACKGROUND

The invention relates generally to separation devices. In particular, the invention relates to attachment devices that can suddenly fragment without an explosive charge or resulting scattered debris.

Many military, aerospace and industrial components are fixed together by fastener bolts. Under circumstances in which these bolts must be suddenly and destructively severed on command, these bolts include an internal axial bore into which is inserted an explosive charge of chemically sensitive components. Upon command, an electric signal energizes a firing mechanism in the charge, thereby severing the bolt and disconnecting the fastened components. Extensive shielding is required to protect nearby sensitive components from damage caused by the resulting fragments. Nonetheless, explosive charges invoke a connotation of risk from premature thermal and electrical initiation, whether accidental or premature.

SUMMARY

Conventional explosive fasteners yield disadvantages addressed by various exemplary embodiments of the present invention. In particular, exemplary embodiments provide an axially separable fastener for command detachment across a structure upon command of an electric signal. The fastener includes a bolt, an external nut, a frangible ampoule containing a liquid metal eutectic and an internal plug. The bolt has a shank and a first head, with the fastener operating between the first head and the external nut. The shank has a first helical external thread and a bore having a first helical internal thread.

The external nut screws onto the first external thread. The ampoule contains a liquid metal eutectic. The ampoule is insertable into the bore. The internal plug includes a second head, an actuator mechanism, and an auger opposite thereto. The internal plug has a second helical external thread between the second head and the auger for screwing into the bore along the first internal thread. Upon receipt of the signal, the internal plug axially drives the auger into the ampoule to release the eutectic causing the bolt to fracture. This releases the structure secured by the fastener.

BRIEF DESCRIPTION OF THE DRAWINGS

These and various other features and aspects of various exemplary embodiments will be readily understood with reference to the following detailed description taken in conjunction with the accompanying drawings, in which like or similar numbers are used throughout, and in which:

FIGS. 5A, 5B and 5C are schematic views of eutectic interaction;

DETAILED DESCRIPTION

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the present invention is defined only by the appended claims.

The disclosure generally employs quantity units with the following abbreviations: length in inches (″) or meters (m), volume in liters (L), mass in grams (g), time in seconds (s), force in pounds-force ($lb_f$) or newtons (N), temperatures in degrees celsius (° C.) and current in amperes (A).

Exemplary embodiments provide a threaded bolt composed of a structural metal that mechanically severs by localized exposure to a liquid metal eutectic. The primary example for structural metal is aluminum (Al) for this description. The primary example for the liquid metal is an amalgam of gallium (Ga), indium (In) and tin (Sn). Commercially known as galinstan, this eutectic comprises by weight 68.5% Ga, 21.5% In and 10.0% Sn and melts at −19° C. Galinstan has low toxicity unlike mercury, (Hg) and low reactivity unlike the sodium-potassium (NaK) alloy.

Exemplary embodiments function by intergranular decohesion of metal lattice bonds, which effectively dissolves their interatomic structure. The eutectic material interposes between lattice atoms, thereby reducing the bonding energy along an atomic grain surface boundary. This reduces the tensile strength between grain boundaries, causing mechanical separation along long-grain boundaries. The effect results from physical reduction in atomic binding energy, rather than by chemical reaction. This enables the structural metal in the bolt to fracture without blast pressure or secondary fragmentation.

Figure 1:
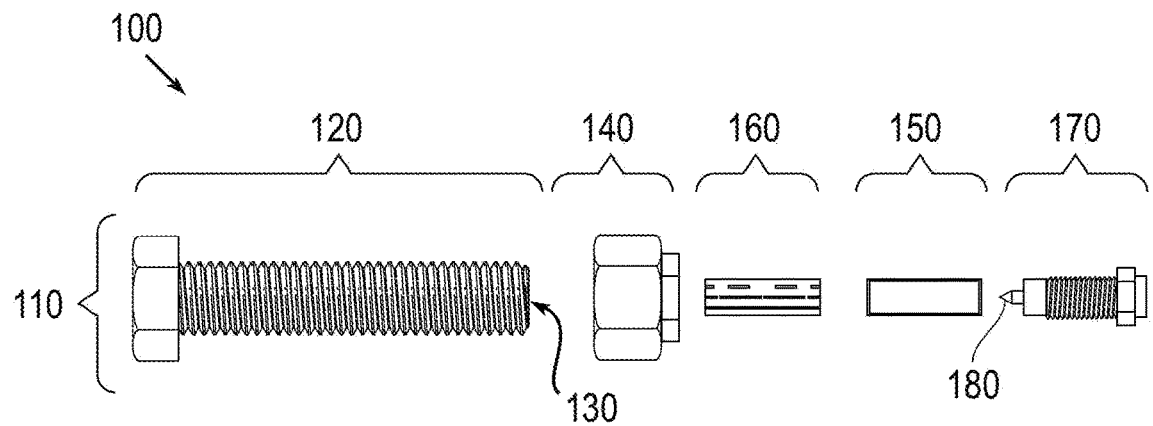
FIG. 1 is an elevation exploded view of exemplary components.

FIG. 1 shows an elevation exploded view 100 of separation device components 110. An exemplary aluminum bolt 120 includes a hollow internal axial bore 130 at its distal end. This bolt 120 represents an axial fastener. An external hexagonal nut 140 screws onto the bolt 120. A cylindrical ampoule 150 contains a volume filled with a eutectic 160. The ampoule 150 inserts into the bore 130 and is preferably be composed of frangible materials, such as glass (silicon dioxide $SiO_2$). An internal plug 170 inserts through the bore 130 into the bolt 120. The plug 170 includes an actuated percussion auger 180 having a nosetip to break the ampoule 150 on command. The quantity of eutectic 160 to sever the bolt 120 is volumetrically exaggerated for visual convenience and for a ∅0.50" diameter bolt 120 or even larger, requires only a few grams.

Figure 2:
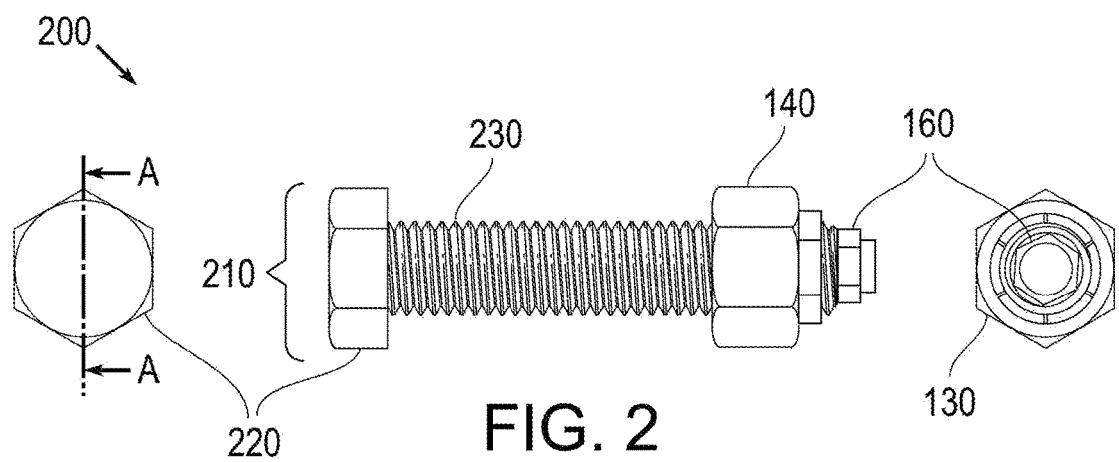
FIG. 2 is an elevation assembly view of a separable fastener.

FIG. 2 shows elevation assembly views 200 of a separable fastener 210. The exemplary bolt 120 comprises a hexagonal head 220 at its proximal end and a helical external thread 230 along the shank. The external nut 140 has a helical internal thread that screws onto the external thread 230 to secure the assembly 210 within a structure between the head 220 and the nut 140 to remain connected in compression between these flanges until command separation. The head 220 features a cross-section line A-A.

Figure 3:
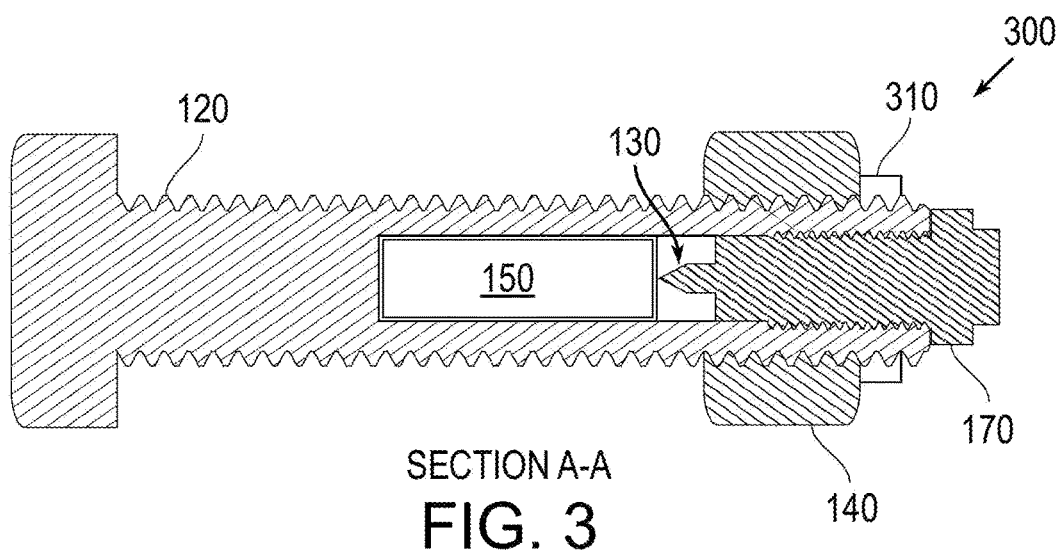
FIG. 3 is an elevation cross-section assembly view of the fastener.

FIG. 3 shows an elevation cross-section assembly view 300 of separable fastener 210 along section line A-A from view 200. The glass ampoule 150 is contained within the internal axial bore 130 of the bolt 120. The internal plug 170 has a helical external thread that engages a helical internal thread of the bore 130 at its opening. The external nut 140 is secured by a lock washer 310 to avoid backout from vibration.

The example fastener on which preliminary testing were performed are 4" long ½-13 UNC bolts 120 composed of 2014-T4 aluminum alloy. The axial bore 130 was an ¹¹⁄₃₂" hole center drilled to a depth of 1.5" and 0.50 mL of eutectic was applied at a load of 4000 $lb_f$. At a density of 6.44 g/mL, the mass of this volume of galinstan would be ~3.2 g. An example demonstration utilized the eutectic commercially known as galinstan, which is composed of 68.5% gallium, 21.5% indium, and 10.0% tin.

Figure 4:
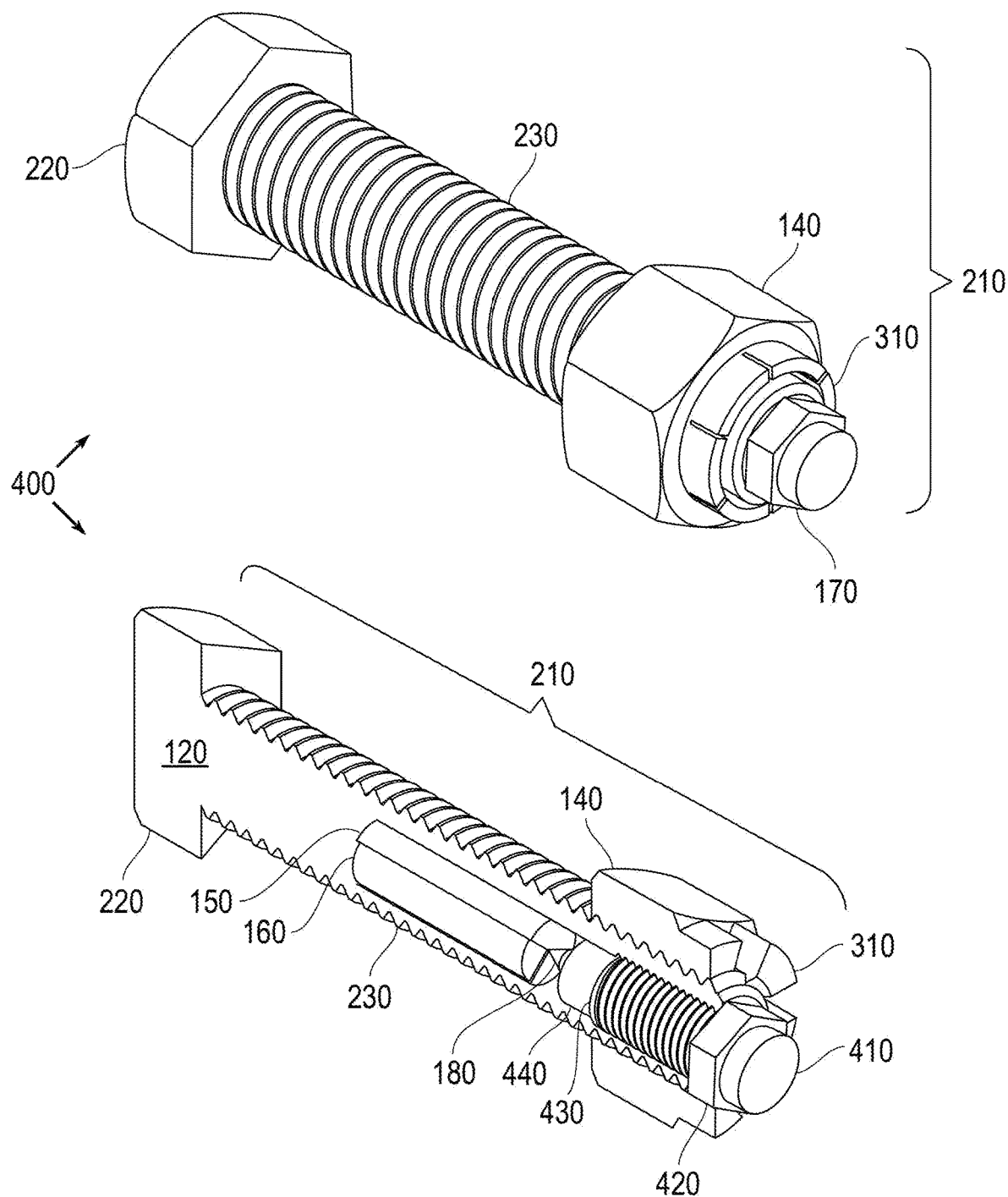
FIGS. 4A and 4B are isometric assembly and cutaway views of the fastener.

FIGS. 4A and 4B show an isometric assembly and cutaway views 400 of the separable fastener 210. The internal plug 170 includes a nose 410 and a hex cap 420 to seal the bore 130. The plug 170 in the configuration shown denotes an actuator to drive the auger 180 in the proximal direction into the ampoule 140. Inserted into the bore 130, the plug 170 further includes a threaded shank 430, a cylindrical tail 440 terminating in the auger 180.

FIGS. 5A, 5B and 5C show atomic schematic views 500 of the intergranular decohesion process before exposure 510 (FIG. 5A), bond shift initiation 520 (FIG. 5B) and material separation 530 (FIG. 5C). An aluminum lattice 540 comprises a crystalline structure of aluminum (Al) atoms 550 held by bonds 555. A gallium (Ga) atom 560 is disposed along an exposed surface of the lattice 540. View 520 shows the gallium atom 560 forming weak bonds 565 (i.e., lower energy) with the aluminum atoms 550. As the weak bonds 565 form, the gallium atom 560 pushes aside neighboring aluminum atoms 560 shown in view 530. This creates a gap 570 in the lattice 540, initiating rapid separation of the lattice 540 into upper and lower portions 580 and 590. This division can be accomplished without rapid gaseous expansion as exemplified by chemical explosives. Both the sudden overpressure from the explosion and the debris that scatters constitute safety hazards that exemplary embodiments obviate.

The gallium atom 560 can be disposed at the interface of two grains within a solid aluminum structure shown by the lattice 540. The gallium atom 560 reduces the bonding energy between the aluminum grains by interfering with the bonds 555 between the grains and separating them as portions 580 and 590. The gallium atom 560 continues to separate the grain boundary by reducing the bonding energy along the grain boundary effectively cracking (unzipping) the solid metal along this grain boundary illustrated by the gap 570. This behavior is documented by Kalman, D: "*A Review of Recent Advances in the Understanding of Liquid Metal Embrittlement*", Los Alamos National Laboratory, LA-UR-18-24764 (2018), published in Corrosion 75(1), Jan. 2019 (and available at https://www.osti.gov/pages/servlets/nurl/1479997).

Exemplary embodiments leverage the phenomena of intergranular decohesion (sometimes referred to as liquid metal embrittlement) as a mechanism to separate a fastener 210 as an alternative to pyrotechnic options. This phenomenon is not chemical, endothermic, or exothermic. Intergranular decohesion is a closed system physical response of a solid metal to eutectic presence wherein the bonding energies of the solid metal are weakened to the point of failure by the absorption of the eutectic preferentially along the grain boundaries of the solid metal.

For the exemplary embodiments, aluminum was selected for the structural material of the fastener 210. In particular, aluminum is highly soluble in gallium and forms an alloy with the gallium. Typically, aluminum builds an oxide layer along its periphery, which protects the aluminum from exposure to other elements. Gallium penetrates the oxide layer that forms around aluminum, enabling the gallium and aluminum to form an alloy. Observation of the Periodic Table of Elements shows aluminum and gallium to be in group IIIA having similar electron shell configurations. Although iron (Fe, group VIIIB) and copper (Cu, group IB) do not share the same shell configurations as the eutectic mercury (Hg, group IIB), these materials exhibit similar alloying responses.

In the exemplary design, the bolt 120 is composed of a structural aluminum alloy of 2021-T4. This alloy among others is effectively reduced in strength by the presence of gallium. Typical reduction in strength of aluminum in an optimized system is at least 80% less than the normal yield, with measured crack growth rates of 1 m/s to 2 m/s. For example, an aluminum component designed to yield in tension at 1000 $lb_f$, when exposed to gallium that item would yield instead at 200 $lb_f$ or less.

Figure 6A:
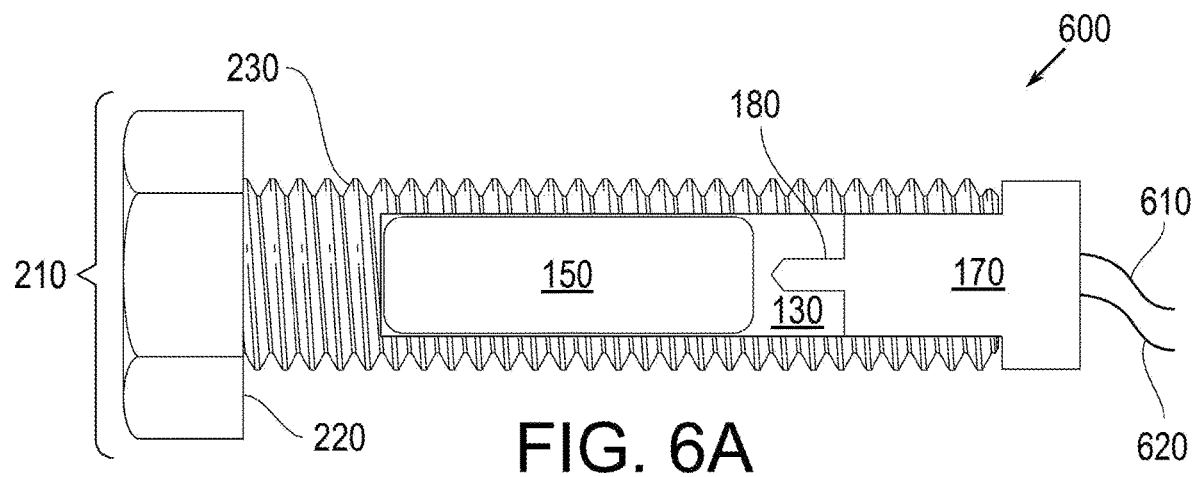
FIGS. 6A, 6B and 6C are cross-section elevation views of the separable fastener in operation.
Figure 6B:
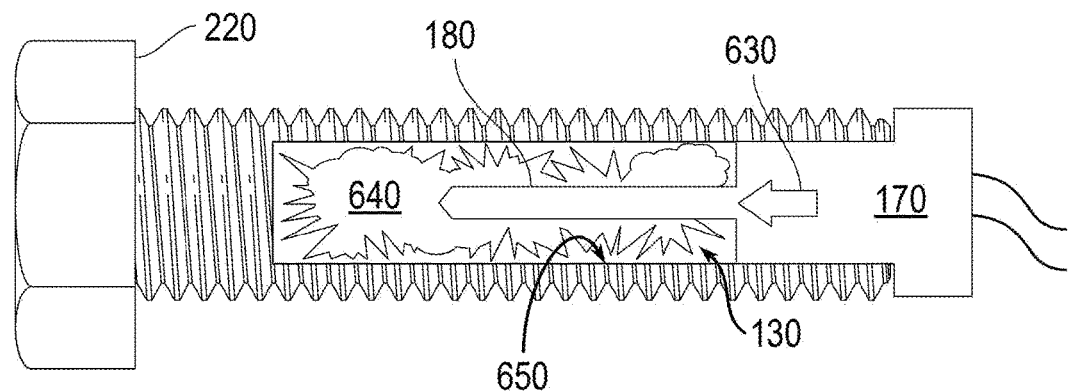
Figure 6C:
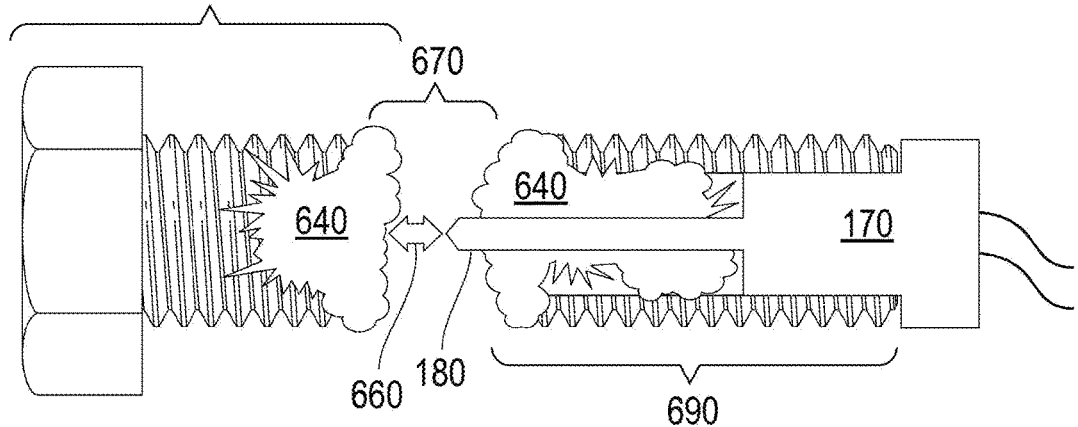

FIGS. 6A, 6B and 6C show elevation cross-section views 600 of an exemplary separable fastener 210. A pair of fuze wires 610 and 620 transfer an electrical signal to the plug 170. This initiates an actuator internal to the plug 170 to drive the auger 180 into the ampoule 150 in a forward direction 630 (from distal to proximal ends). The rupture of the ampoule 150 from penetration by the auger 180 releases the confined eutectic 160 as a wetting agent into the bore 130 exposing the internal surface 640. Axial motion from the auger 180 pushes the proximal and distal ends apart 650 fracturing the fastener 210.

This released eutectic 160 includes gallium atoms 560 that causes the aluminum atoms 550 in the bolt 120 to create a gap 660, which divides the bolt 120 into proximal and distal portions 670 and 680. An exemplary auger 180 for insertion into the plug 170 would be the 1SE601 Puncturing Cutter from EaglePicher Technologies in Joplin, MO. The 1SE601 actuates at 4.5 A operating in 20 ms. The plug 170 portion has a length of 0.74" including the hex nut 420. The auger 180 has a ∅0.099" diameter.

Figure 7A:
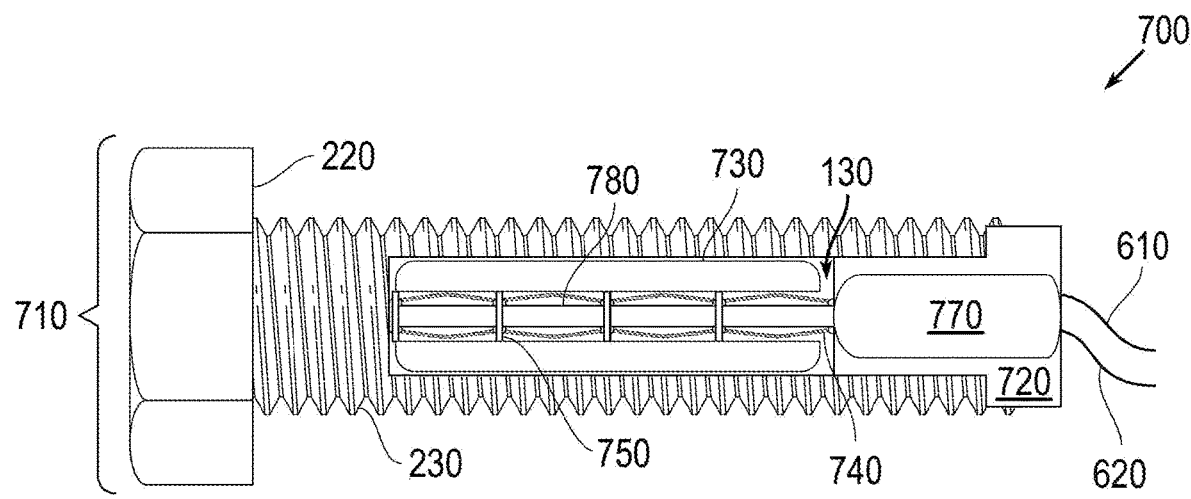
FIGS. 7A, 7B and 7C are cross-sectional elevation views of an alternate embodiment of the separable fastener in operation.
Figure 7B:
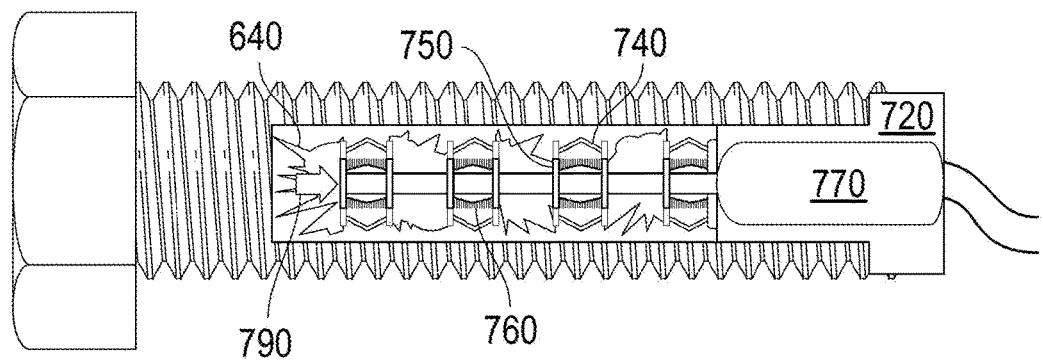
Figure 7C:
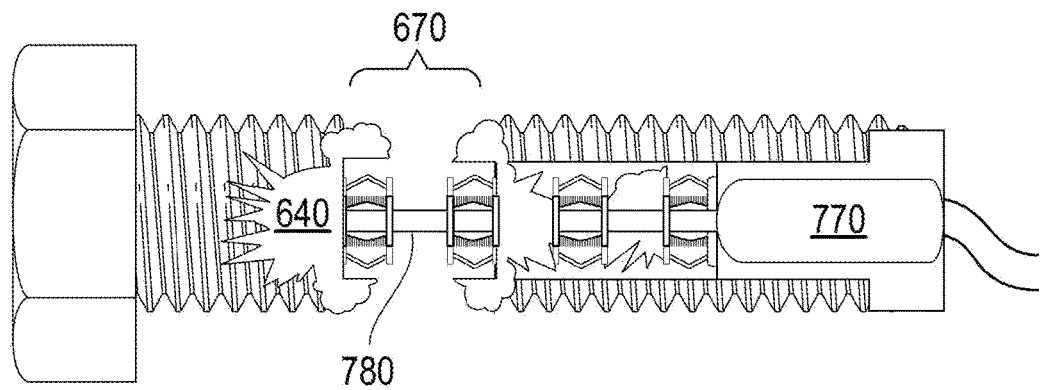

FIGS. 7A, 7B and 7C show elevation cross-section views 700 of an alternative embodiment 710 for non-explosive fastener separation. The bolt 120 remains substantially the same as in the exemplary fastener 210, albeit with plug alteration as an insert housing 720. The bore 180 contains an annular "doughnut" shaped ampoule 730, along with outer accordion rings 740 separated by annular rakes 750 and inner accordion rings 760. Initiation by a signal through the wires 610 and 620 activates a retraction actuator 770 to pull its plunger 780 to in the distal direction 790. This linear motion compresses the rakes 750 together and collapses the rings 740 and 760, thereby shattering the ampoule 730 to release the eutectic 160 and thereby fracturing the fastener 710.

An exemplary actuator 770 with plunger 780 would be the 1MT18 Retractable Actuator from EaglePicher Technologies in Joplin, MO. The 1MT18 is a pyrotechnic-actuated device weighing 12 g with activation current depending on selected squib type, activating in 10 ms. The length of the actuator 770 is 1.00" in length and has a ⌀0.375" diameter. The plunger 780 has a ⌀0.15" diameter and can extend to 0.44" in length. In the exemplary configuration shown, the plunger 780 includes an extension with the gates 750 attached thereto.

On command via a signal through the fuze wires 610 and 620, the ampoule 150 of eutectic 160 inside the bore 130 of the bolt 120 is ruptured by an electrically actuated mechanism such as the auger 180 driven by the plug 170 to dispense the eutectic 160 to facilitate the intergranular decohesion of the bolt 120 and thereby its structural integrity. Two potential initiation methods include linear crushing shown in view 700 and internal expansion shown in view 600.

While certain features of the embodiments of the invention have been illustrated as described herein, many modifications, substitutions, changes and equivalents will now occur to those skilled in the art. It is, therefore, to be understood that the appended claims are intended to cover all such modifications and changes as fall within the true spirit of the embodiments.

What is claimed is:

1. An axially separable fastener to detach upon command of an electric signal, said fastener comprising:
    a bolt having a metal shank with proximal and distal ends, said shank including a first head at said proximal end, and a first helical external thread and an axial bore with a first helical internal thread at said distal end;
    an external nut for screwing onto said first external thread with the fastener operating between said first head and said external nut;
    a frangible cylindrical ampoule containing a liquid metal eutectic, said ampoule being insertable into said bore; and
    an internal plug having a second head, an extending actuator, an auger opposite said second head, and a second helical external thread between said second head and said auger for screwing into said bore along said first internal thread, wherein,
    upon receipt of the signal, said actuator axially drives said auger towards said proximal end into said ampoule to release said eutectic within said bore, thereby detaching said bolt.

2. The fastener according to claim 1, wherein said bolt comprises substantially of aluminum, and said eutectic comprises substantially of gallium.

3. The fastener according to claim 2, wherein said eutectic is galinstan.

4. The fastener according to claim 1, wherein said ampoule comprises of silicon dioxide glass.

5. An axially separable fastener to detach upon command of an electric signal, said fastener comprising:
    a bolt having a metal shank with proximal and distal ends, said shank including a first head at said proximal end, and a first helical external thread and an axial bore with a first helical internal thread at said distal end;
    an external nut for screwing onto said first external thread with the fastener operating between said first head and said external nut;
    a frangible annular ampoule containing a liquid metal eutectic, said ampoule being insertable into said bore; and
    an internal plug having a second head, a retracting actuator and a plunger opposite said second head, said plunger extending through said ampoule, wherein
    upon receipt of the signal, said actuator axially drives said plunger towards said distal end for rupture of said ampoule to release said eutectic within said bore, thereby detaching said bolt.

6. The fastener according to claim 1, wherein said bolt is comprises substantially of aluminum, and said eutectic is comprises substantially of gallium.

7. The fastener according to claim 6, wherein said eutectic is galinstan.

8. The fastener according to claim 5, wherein said ampoule comprises of silicon dioxide glass.

9. An axially separable fastener having a metal shank with compression flanges at each of proximal and distal ends, said shank to detach upon command of an electric signal, said fastener comprising:
    an axial bore within the shank from the distal end;
    a frangible ampoule containing a liquid metal eutectic for disposition within said bore; and
    an internal plug having an actuator and a probe, said plug inserting into said bore to seal said ampoule therein, wherein
    upon receipt of the signal, said actuator axially drives said probe to rupture said ampoule and release said eutectic within said bore, thereby detaching said bolt.

10. The fastener according to claim 9, wherein said bolt comprises substantially of aluminum, and said eutectic comprises substantially of gallium.

11. The fastener according to claim 10, wherein said eutectic is galinstan.

12. The fastener according to claim 9, wherein said ampoule comprises of silicon dioxide glass.

13. The fastener according to claim 9, wherein the proximal compression flange is a bolt head, and the distal compression flange is a nut.

14. The fastener according to claim 9, wherein said probe penetrates said ampoule by extension from said actuator.

15. The fastener according to claim 9, wherein said probe compresses said ampoule by retraction towards said actuator.

* * * * *